United States Patent
Salka

[15] 3,637,485
[45] Jan. 25, 1972

[54] HYDROCARBON FEED STRIPPING WITH GAS STRIPPED FROM THE REACTOR EFFLUENT

[72] Inventor: Arnold I. Salka, Walnut Creek, Calif.
[73] Assignee: Chevron Research Company, San Francisco, Calif.
[22] Filed: Sept. 26, 1969
[21] Appl. No.: 862,163

[52] U.S. Cl..............................208/211, 208/81, 208/212
[51] Int. Cl.................................................C10g 23/00
[58] Field of Search................208/347, 350, 351, 354, 364, 208/81, 82, 100, 211, 212

[56] References Cited

UNITED STATES PATENTS

| | | | |
|---|---|---|---|
| 1,868,204 | 7/1932 | Herthel | 208/82 |
| 2,766,179 | 10/1956 | Fenske et al. | 208/211 |
| 3,006,840 | 10/1961 | Smith et al. | 208/82 |
| 3,384,577 | 5/1968 | Shaffer et al. | 208/347 |

*Primary Examiner*—Delbert E. Gantz
*Assistant Examiner*—G. J. Crasanakis
*Attorney*—A. L. Snow, F. E. Johnston, C. J. Tonkin and T. G. De Jonghe

[57] ABSTRACT

The reactor effluent from a hydroconversion process is (1) passed directly to an effluent stripper, components, hydrogen and light hydrocarbons are stripped by passing a hydrogen-rich gas stream through the stripper in countercurrent flow to said effluent and (3) the hydrogen and light hydrocarbons from the effluent stripper are then passed to a feed stripper to strip oxygen eluant the hydrocarbon feed which is utilized in the hydroconversion process. The invention finds particular utility in hydrodesulfurization.

7 Claims, 1 Drawing Figure

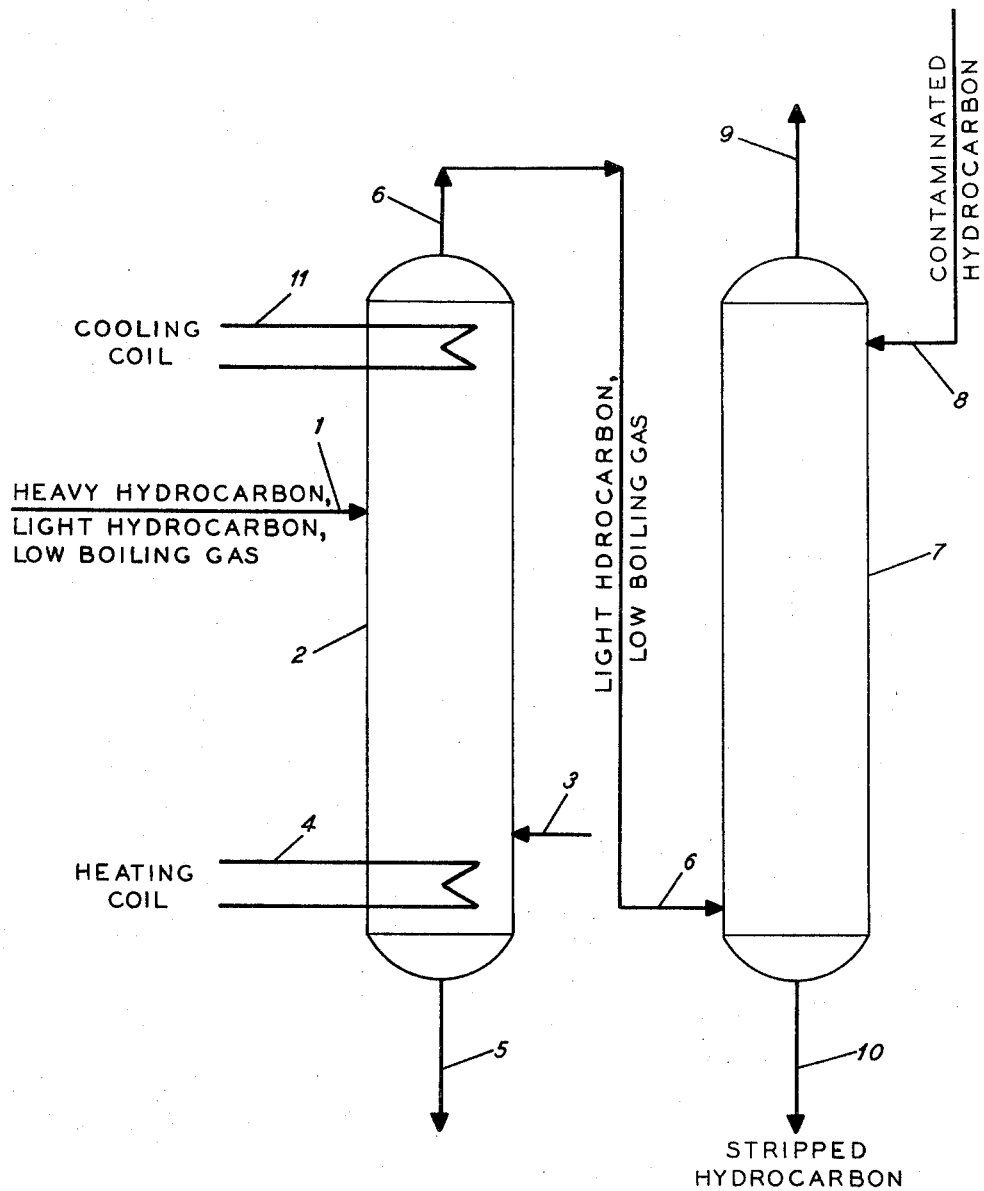

HYDROCARBON FEED STRIPPING WITH GAS STRIPPED FROM THE REACTOR EFFLUENT

BACKGROUND OF THE INVENTION

1. Field of the Invention

The present invention relates to fractionation or distillation methods and more particularly to improvements in stripping hydrocarbon streams. Still more particularly the present invention relates to the integration of the operation of two stripping columns, preferably the integration of stripping columns used in a hydroconversion process.

2. Prior Art

It is well known in the art to use distillation or fractionation means to separate components which are present in a feed mixture. Nearly all chemical process units and/or petroleum process units have distillation means to separate the products which are made during the processing. Normally, the fractionation method involves the use of a distillation tower wherein a feed is injected at an intermediate location, heat is applied to the heavier portion, and reflux is used on the overhead system so that the upper portion of the distillation column operates as a rectification zone and the lower portion below the feed point operates as a stripping zone. This mode of operation, of course, is conventionally and well known and works satisfactorily on feed mixtures where it is desirable to separate lighter boiling components from heavier boiling components. On the other hand, if it is desired to remove very light components from a normally liquid stream, it is sometimes desirable to utilize the distillation means in strictly a stripping manner.

Accordingly, the prior art process of operating stripping towers, such as those useful in removing gases from hydrocarbons, is generally to feed heated streams into the upper portion of a tower containing liquid and vapor contacting means, reboil the bottom portion of the tower, and/or inject steam or other inert stripping medium in the bottom section in order to strip the dissolved gases from the liquid stream. These gases are removed overhead while the purified oil is removed from the bottom of the tower.

Frequently a plant will contain two or more stripping columns. For example, a hydroconversion plant such as a hydrodesulfurization or hydrofining plant may employ two or more stripping columns in the overall plant operation. In many hydroconversion plants a feed stripping column is used to strip contaminating oxygen from the hydroconversion feedstock and an additional stripping column is used to strip undesired constituents from the hydroconversion reactor effluent stream.

In the past it has been the practice to operate the various strippers in a plant, such as a hydroconversion plant, independently. At least it is not believed that the operation of stripping columns for a given plant have been integrated as is done according to the process of the present invention.

SUMMARY OF THE INVENTION

According to the present invention, a process is provided for stripping a first and a second hydrocarbon stream, wherein said first hydrocarbon stream comprises a very low boiling gas, light hydrocarbons, and heavier hydrocarbons, and said second hydrocarbon stream comprises a contaminant and heavy hydrocarbons, which comprises:

a. stripping said first hydrocarbon stream in a first stripping column to obtain a stripped stream comprising said heavier hydrocarbons and an overhead stream comprising said very low boiling gas and light hydrocarbons, b. using said overhead stream to strip said contaminant out of said second hydrocarbon stream in a second stripping column, and c. maintaining the first stripping column at a pressure at least 10 p.s.i. higher than the pressure in the second stripping column.

One of the advantages of the process of the present invention is that a separate stripping gas is not required to strip the hydrocarbons which are fed to the second stripping column. According to the process of the present invention, the hydrocarbons which are fed to the second stripping column are stripped by using the overhead stream from the first stripping column.

In the process of the present invention, it is important to maintain the pressure in the first stripping column at a higher pressure than the pressure employed in the second stripping column. The economic attractiveness of the process of the present invention is substantially diminished if a gas compressor is required in order to boost the pressure of the overhead stream from the first distillation column to a higher pressure in order to be able to enter the second stripping column to accomplish the stripping of the second hydrocarbon stream. Therefore the process of the present invention includes maintaining the first stripping column at a pressure at least 10 p.s.i. higher than the pressure in the second stripping column. Specifically, the pressure of the overhead stream withdrawn from the first stripping column is withdraws from the overhead system of the first column at a pressure at least 10 p.s.i. higher than the pressure in the bottom of the second stripping column.

The process of the present invention is applied to the stripping of hydrocarbon streams and more specifically is applied to the stripping of a first hydrocarbon stream which contains at least a very low boiling gas and light hydrocarbons in addition to heavier hydrocarbons, which heavier hydrocarbons are desired as the stripped bottom product from the first stripping column. The very low boiling gas is preferably hydrogen but can also be other gases such as carbon dioxide, nitrogen and methane. It is preferred that the very low boiling gas have a boiling point no higher than the boiling point of methane.

The light hydrocarbons which are meant to be included by the term "light hydrocarbons" used in the present specification are those hydrocarbons having from two to five carbon atoms per molecule. Light hydrocarbons such as $C_5$'s and $C_4$'s, for example pentanes and butanes, are relatively valuable light hydrocarbons. One particularly important advantage of the present invention is that these light hydrocarbons can be substantially recovered in the integrated stripping process rather than being left to relatively low value fuel gas.

In many instances, substantial amounts of light hydrocarbons are stripped overhead in the first stripping column because of the particular conditions prevailing in the first stripping column, namely temperature, pressure, and feed composition. The overhead gaseous or vapor steam obtained from the first stripping column typically is used as a fuel gas in accordance with prior processing schemes. Thus light hydrocarbons present in the overhead stream from the first stripping column are burned at fuel value rather than being ultimately recovered in a more valuable product such as gasoline. In accordance with the process of the present invention, the overhead stream from the first stripping column is used as a stripping gas in the second stripping column but the second stripping column in most instances is operated at conditions of temperature, pressure and feed composition such that the feed hydrocarbons to the second stripping column absorb light hydrocarbons at the same time that the feed hydrocarbon to the second stripping column is being stripped of a contaminant such as oxygen.

Preferably the second stripping column is operated at a sufficiently low temperature so that at least 30 volume-percent of the $C_4$ and $C_5$ light hydrocarbons in the overhead stream from the first stripping column are absorbed in the feed hydrocarbons to the second stripping column. Thus preferably the second hydrocarbon stream is fed to the second stripping column at a temperature at least 50° F. below the temperature at which the first hydrocarbon stream is fed to the first stripping column. The lower temperature enables the second hydrocarbons to absorb and retain light hydrocarbons which are stripped overhead in the first stripping column.

It is particularly advantageous to apply the process of the present invention to a hydroconversion process wherein a feed hydrocarbon is hydroconverted in a reactor at elevated temperature and pressure in the presence of hydrogen fed to the reactor by operating according to the following steps: (a) stripping hydrogen and light hydrocarbons from the reactor effluent by passing a stripping gas as, for example, a hydrogen-rich gas stream, in countercurrent flow to the reactor effluent in a reactor effluent stripper to obtain a gas stream which contains light hydrocarbons, and then (b) using this gas stream containing light hydrocarbons to strip oxygen from the hydroconversion feed hydrocarbons in a feed stripper operated at a pressure maintained below the pressure of the effluent stripper.

In such a hydroconversion process the process of the present invention is particularly preferred when the hydroconversion process is operated with once-through hydrogen and the hydroconversion reactor effluent is passed to an effluent stripper without previously passing the reactor effluent to a vapor liquid separator. One of the particular advantages of this mode of operation is that the overhead stream from the effluent stripper is rich in hydrogen, thus providing a particularly advantageous stripping gas for use in the hydroconversion feed stripper column.

The term "hydroconversion" is used in the present specification to include processes wherein hydrocarbons are converted to more valuable products by reaction with hydrogen. Examples of hydroconversion processes include hydrosulfurization and hydrofining processes such as hydrotreatment of naphtha feedstocks for reforming processes.

BRIEF DESCRIPTION OF THE DRAWING

The drawing is a schematic flow diagram illustrating an embodiment of the process of the present invention.

DETAILED DESCRIPTION OF THE DRAWING

Referring now more particularly to the drawing, a feed stream consisting of heavy hydrocarbons, light hydrocarbons and low boiling gas is fed via line 1 to distillation or stripping column 2. In most instances it is desired to strip the low boiling gas as well as possible impurities out of the heavy hydrocarbon portion of feed stream 1. This is accomplished by upward flowing vapors in the stripping column. The upward flowing vapors pass countercurrent to the heavy hydrocarbons to effect the stripping and the stripped heavy hydrocarbon stream is removed from the bottom of the stripping column via line 5. The upward flowing stripping vapors or gases can be introduced to stripping column 2 via line 3. The stripping gas can be steam or hydrogen or other gases which are very volatile and not usually extensively absorbed into the heavy hydrocarbons. Upward flowing stripping vapors may also be obtained by heating the material in the lower part of the column by use of a reboiler or a heating coil as indicated by heating coil 4. Heating coil 4 thus generates hot vapors which flow upward in stripping column 2 until they are condensed, or pass overhead in line 6 if they are of high volatility.

Cooling is accomplished in the upper part of the stripping column by cooling coil 11 as indicated schematically in the drawing. In most instances instead of cooling coil 11 an overhead condensing system is provided. The typical overhead cooling system consists of a condenser to cool and condense a portion of the overhead vapors withdrawn via line 6 from stripping column 2, an overhead receiving vessel to collect the condensed portion of the overhead and separate the uncondensed overhead vapors and gases from the condensed portion of the overhead, and a reflux line to transfer relatively cool reflux from the overhead receiving vessel back to the upper part of the stripping column.

In many instances at least a portion of the light hydrocarbon gases which are stripped overhead when a heavy hydrocarbon stream is being stripped include some light hydrocarbons which have a value substantially greater than that of fuel gas.

The process of the present invention is particularly advantageously applied to such a situation in that the overhead gases and vapors which are removed as a net stream from the stripping column or from the stripping column overhead receiving vessel are used as stripping gases in a second stripping column, thus providing an opportunity to recover at least some of the more valuable light hydrocarbons by operating the second stripping column at conditions such that at least a portion of the light hydrocarbons are absorbed into the feed to the second stripping column at the same time that the combined stream of light hydrocarbons and low-boiling gas operate to strip a contaminant from the feed to the second stripping column. Thus as shown in the schematic drawing, light hydrocarbons and low-boiling gas are introduced via line 6 to stripping column 7 to strip a contaminant from hydrocarbons fed to the upper part of stripping column 7 via line 8. As the hydrocarbon feedstock flows downward and countercurrent to the upward flow of light hydrocarbons and low-boiling gas, the contaminant is stripped from the hydrocarbon feed. Preferably conditions are maintained in stripping column 7 such that substantial amounts of the relatively valuable light hydrocarbons are simultaneously absorbed into the hydrocarbon stream being stripped of the contaminant. The contaminant, as well as the low-boiling gas and at least a portion of the light hydrocarbons, are removed from stripping column 7 via line 9. The stripped hydrocarbons, preferably containing the heavier and thus more valuable hydrocarbon constituents of the light hydrocarbons introduced to the stripping column via line 6, are removed from stripping column 7 via line 10.

EXAMPLE

This example is directed to the use of the process of the present invention in a naphtha-hydrotreating process, specifically a naphtha-hydrotreating plant which is used to remove relatively small amounts of sulfur from a naphtha feed to prepare the naphtha feed for catalytic reforming. The feed to the naphtha hydrotreater is about 2 million standard cubic feet per day ($\overline{\text{MSCFD}}$) of approximately 80 percent purity hydrogen and about 40,000 pounds per hour of 57° API naphtha, having a sulfur content of about 300 p.p.m. by weight on a sulfur basis. The sulfur is present in the naphtha in the form of various organic sulfur compounds. This organically bound sulfur is removed from the naphtha in the hydrotreating process by converting the sulfur to hydrogen sulfide which is very volatile and easily removed from the naphtha.

Generally the naphtha is fed to the naphtha-hydrotreating plant from storage facilities. While the naphtha is kept in the storage facilities it usually become contaminated with small amounts of oxygen, which oxygen causes fouling problems in the heat exchangers ahead of the naphtha-hydrotreating reactor unless the oxygen is stripped out of the feed naphtha.

In accordance with the present example, oxygen is stripped out of the feed naphtha in feed stripper operated at about 125 p.s.i.g. Naphtha from storage is fed to the upward part of the feed stripper (the feed stripper is referred to as the "second stripping column" under Summary of the Invention) and passes downwardly in the feed stripper in countercurrent flow to an upward flowing stream of hydrogen and light hydrocarbons which are fed to the lower part of the feed stripping column. The stripping stream of hydrogen and light hydrocarbons are fed to the bottom of the stripper at a temperature of about 100° F. The naphtha is fed to the feed stripper at a temperature of about 100° F. and is removed at a temperature of about 100°–120° F.

The pressure of the liquid naphtha feed removed by means of a liquid pump. The feed naphtha is heated by countercurrent heat exchange with the naphtha-hydrotreater reactor effluent to a temperature of about 575° F. The feed naphtha is then further heated to a temperature of about 720° F. by countercurrent heat exchange with reactor effluent from downstream reformer reactors. The naphtha is fed together with about 2MSCFD of hydrogen to a hydrotreating reactor containing catalyst effective to catalyze hydrodesulfurization of the naphtha feedstock. The naphtha is withdrawn from the reactor at a temperature of about 720° F. and cooled to about 270° F. by countercurrent heat exchange with feed naphtha.

The effluent from the naphtha-hydrotreater reactor is then fed to an effluent stripper (the effluent stripper is referred to as the "first stripping column" under Summary of the Invention) wherein it is passed in countercurrent flow to a hydrogen-rich stream introduced at the lower part of the effluent stripper. Hydrogen sulfide is removed from the hydrotreated naphtha by the stripping carried out in the effluent stripper and by the pressure reduction from about 620 p.s.i.g. in the naphtha-hydrotreater reactor to about 155 p.s.i.g. in the effluent stripper. The stripped hydrotreated stream of naphtha is withdrawn from the bottom of the effluent stripper at a temperature of about 240° F. and is then passed as feed to catalytic reforming.

About 1½ million standard cubic feet per day (MSCFD) of hydrogen-rich gas is used as the stripping gas in the effluent stripper. Preferably, this stripping gas is obtained as hydrogen-rich catalytic reformer off gas. The overhead gas and vapor stream is removed from the effluent stripper at a temperature of about 220° F. The total overhead removed from the effluent stripper amounts to about 4.3 million standard cubic feet per day or 10,100 pounds per hour. This overhead stream is cooled in an overhead condenser to a temperature of about 100° F. The condensed portion of the overhead is then refluxed back to the upper part of the effluent stripper. The uncondensed portion of the overhead is removed from the overhead receiving vessel and used as the previously mentioned stripping gas for the feed stripper. The pressure prevailing in the top of the overhead receiving vessel for the effluent stripper is about 145 p.s.i.g. Thus the differential between the pressure of the uncondensed overhead gases from the effluent stripper and the pressure maintained in the feed stripper is 20 p.s.i.

The approximate composition by volume of the condensed overhead gases from the effluent stripper is as follows: $H_2$, 75 percent; $H_2S$, 0.1 percent; $C_1-C_3$, 19.0 percent; $C_4$, 4.1 percent and $C_5+$, 1.8 percent. Thus it is apparent that the uncondensed overhead from the effluent stripper contains substantial amounts of valuable light hydrocarbons in addition to the large amount of hydrogen gas. Although the overhead of the effluent stripper is cooled to about 100° F., a large amount of light hydrocarbons are left in the hydrogen-rich uncondensed portion of the reactor effluent stripper overhead vapor because of the relatively high temperature (about 240° to 270° F.) prevailing in most of the effluent stripper, which high temperatures cause a large amount of light hydrocarbons to be present in the total overhead removed from the effluent stripper. About 60–70 volume-percent of the $C_4$ and $C_5$ light hydrocarbons present in the uncondensed overhead from the effluent stripper are absorbed into the contaminated feed naphtha fed to the feed stripper at a temperature of about 100° F. Thus a substantial recovery of light hydrocarbons stripped from the naphtha hydrotreater is achieved at the same time the overhead gases from the naphtha-hydrotreater effluent stripper are used to strip the contaminant oxygen from the naphtha feedstock.

Integration of the two stripping columns as described above in this example is particularly advantageous in a "once-through" hydrogen reactor system such as a naphtha-hydrotreating unit using once-through hydrogen. Once-through hydrogen is used to connote a system with no recycle of hydrogen from the reactor effluent back to the reactor (e.g., hydrotreater reactor) inlet. A once-through hydrogen system is advantageously operated with the integration of the two stripping columns and without a separate vapor-liquid flash drum between the hydroconversion reactor and the hydroconversion reactor effluent stripping column. Also, in this preferred embodiment, less cooling of the hydroconversion reactor effluent is required than when a separate vapor-liquid separator (flash drum) is used to receive the hydroconversion reactor effluent. Thus, particularly in this preferred embodiment, investment and operating costs are reduced compared to that required when operating according to normal design, i.e., without integrated strippers in a once-through hydrogen system.

Although various specific embodiments of the invention have been described and shown, it is to be understood they are meant to be illustrative only and not limiting. Certain features may be changed without departing from the spirit or essence of the invention. It is apparent that the present invention has broad application to the integrated operation of two stripping columns. Accordingly, the invention is not to be construed as limited to the specific embodiments illustrated but only as defined in the appended claims.

I claim:

1. In a hydroconversion process wherein a feed hydrocarbon is hydroconverted in a reactor at elevated temperatures and pressures in the presence of hydrogen fed to the reactor, and wherein the hydrogen is passed once through the reactor and is not recycled, the improvement which comprises:
   a. passing the reactor effluent to an effluent stripper without previously passing the reactor effluent to a vapor-liquid separator.
   b. stripping hydrogen and light hydrocarbons from the reactor effluent by passing a hydrogen-rich gas stream in countercurrent flow to the reactor effluent in the effluent stripper to obtain a hydrogen, light hydrocarbon rich gas, and
   c. using the hydrogen, light hydrocarbon rich gas to strip oxygen from the feed hydrocarbon in a feed stripper operated at a pressure maintained below the pressure of the effluent stripper.

2. A process in accordance with claim 1 wherein the feed stripper is operated at a sufficiently low temperature so that at least 30 volume-percent of said light hydrocarbons are absorbed in the feed hydrocarbons.

3. A process in accordance with claim 2 wherein the feed hydrocarbons are fed to the feed stripper to a temperature at least 50° F. below the temperature at which the reactor effluent is stripped.

4. A process in accordance with claim 1 wherein the hydroconversion process is a hydrodesulfurization process.

5. A process in accordance with claim 1 wherein the hydroconversion process is a hydrotreatment process for a naphtha boiling range hydrocarbon feedstock.

6. A process for stripping, in a feed stripper, contaminant oxygen from a naphtha feed stream to a naphtha-hydrotreater reactor and striping, in a product stripper, $H_2S$ from the naphtha-hydrotreater reactor effluent which comprises:
   a. stripping the contaminant oxygen from the naphtha feed stream in the feed stripper using an overhead gas stream obtained from the product stripper,
   b. feeding the stripped naphtha to the naphtha-hydrotreater reactor and therein reacting the naphtha with hydrogen to obtain naphtha-hydrotreater reactor effluent, and
   c. stripping the naphtha-hydrotreater effluent in a product stripper to obtain said overhead gas stream.

7. A process in accordance with claim 6 wherein the hydrogen is passed once through the naphtha-hydrotreater reactor, and the reactor effluent is fed to the product stripper without first being fed to a vapor-liquid separating vessel.

* * * * *